(12) United States Patent
Lee

(10) Patent No.: US 12,552,508 B2
(45) Date of Patent: Feb. 17, 2026

(54) HYBRID PROPULSION SYSTEM FOR BOATS AND SHIPS

(71) Applicant: GREENERGY INVENTIONS INTERNATIONAL LTD, Basingstoke (GB)

(72) Inventor: Christopher John Lee, Thatcham (GB)

(73) Assignee: GREENERGY INVENTIONS INTERNATIONAL LTD, Basingstoke (GB)

( * ) Notice: Subject to any disclaimer, the term of this patent is extended or adjusted under 35 U.S.C. 154(b) by 486 days.

(21) Appl. No.: 17/927,700

(22) PCT Filed: Apr. 21, 2021

(86) PCT No.: PCT/GB2021/000050
§ 371 (c)(1),
(2) Date: Nov. 24, 2022

(87) PCT Pub. No.: WO2021/245366
PCT Pub. Date: Dec. 9, 2021

(65) Prior Publication Data
US 2023/0134213 A1    May 4, 2023

(30) Foreign Application Priority Data
Jun. 1, 2020 (GB) .................................. 20082125

(51) Int. Cl.
*B63H 21/20* (2006.01)
*B63J 3/04* (2006.01)

(52) U.S. Cl.
CPC ................ *B63H 21/20* (2013.01); *B63J 3/04* (2013.01); *B63H 2021/205* (2013.01); *B63J 2003/046* (2013.01)

(58) Field of Classification Search
CPC .............. B63H 21/20; B63H 2021/205; B63H 2021/202; B63J 3/04; B63J 2003/046; B63J 2003/003
See application file for complete search history.

(56) References Cited

U.S. PATENT DOCUMENTS

| 3,304,906 | A  |    | 2/1967  | Nace |
| 3,977,353 | A  |    | 8/1976  | Toyama |
| 7,445,531 | B1 | *  | 11/2008 | Ross ...................... B63H 11/04 440/38 |

(Continued)

FOREIGN PATENT DOCUMENTS

| BR | PI1106513 A2 | 8/2013 |
| CN | 213083464 U  | 4/2021 |

(Continued)

OTHER PUBLICATIONS

Omer Berkehan Inal, et al, "Hybrid power and propulsion systems for ships: Current status and future challenges," Renewable and Sustainable Energy Reviews, vol. 156, 2022, 111965, ISSN 1364-0321, https://doi.org/10.1016/j.rser.2021.111965. (https://www.sciencedirect.com/science/article/pii/S1364032121012302).

(Continued)

*Primary Examiner* — Stephen P Avila
(74) *Attorney, Agent, or Firm* — Rivka Friedman

(57) ABSTRACT

A Hybrid Vessel Propulsion and Generation System diesel jet drive outboard and inboard motors, with an electrical generator attached to a prop shaft of the motors to generate electricity to power batteries. On large boats or ships with a gear change, the generator is mounted on the back of the gearbox and is attached to the prop shaft, with the generator being driven by rotation of the prop shaft and the drive off the gearbox. The system also incorporates electrically powered water thrusters and mechanical pressurized water turbines used for charging the batteries. The system also incorporates electric motors attached to propellers powered by electric batteries. Solar Panels may be arranged in the (Continued)

port hole windows incorporating a housing, latch and lever arms to position them towards the sun.

25 Claims, 2 Drawing Sheets

(56) References Cited

U.S. PATENT DOCUMENTS

| | | | |
|---|---|---|---|
| 7,955,148 | B2 | 6/2011 | Corradini |
| 8,062,081 | B2 | 11/2011 | Barrett et al. |
| 8,216,008 | B2 | 7/2012 | Daffey |
| 8,454,402 | B1 | 6/2013 | Arbuckle et al. |
| 8,725,329 | B1 | 5/2014 | Snyder et al. |
| 8,727,820 | B2 | 5/2014 | Stasolla et al. |
| 9,650,120 | B2 | 5/2017 | Hartig |
| 10,822,068 | B2 | 11/2020 | Mikalsen et al. |
| 2005/0106953 | A1 | 5/2005 | Andersen et al. |
| 2007/0293104 | A1 | 12/2007 | Sandoy et al. |
| 2010/0125383 | A1 | 5/2010 | Caouette |
| 2012/0234386 | A1* | 9/2012 | Kang ............... B63B 29/02 136/259 |
| 2014/0324256 | A1 | 10/2014 | Aschaber |
| 2018/0029682 | A1 | 2/2018 | Kuroiwa et al. |
| 2022/0411033 | A1 | 12/2022 | Molloy |

FOREIGN PATENT DOCUMENTS

| | | | | |
|---|---|---|---|---|
| GB | 2486334 | A | * 6/2012 | ............ B63H 21/17 |
| GB | 2513373 | A | 10/2014 | |
| JP | 2015003658 | A | 1/2015 | |
| JP | 2019018820 | A | 2/2019 | |
| JP | 2019069686 | A | 5/2019 | |
| KR | 20180076937 | A | 7/2018 | |
| KR | 20200006958 | A | 1/2020 | |
| KR | 20220164156 | A | 12/2022 | |
| KR | 20230059552 | A | 5/2023 | |

OTHER PUBLICATIONS

Maria C. Díaz-de-Baldasano et al. "Conceptual design of offshore platform supply vessel based on hybrid diesel generator-fuel cell power plant," Applied Energy, vol. 116, 2014, pp. 91-100, ISSN 0306-2619, https://doi.org/10.1016/j.apenergy.2013.11.049. (https://www.sciencedirect.com/science/article/pil/S0306261913009550).

R.D. Geertsma, et al. "Design and control of hybrid power and propulsion systems for smart ships: A review of developments," Applied Energy, vol. 194, 2017, pp. 30-54, ISSN 0306-2619, https://doi.org/10.1016/j.apenergy.2017.02.060. (https://www.sciencedirect.com/science/article/pii/S0306261917301940).

Łebkowski, Andrzej, and Wojciech Koznowski. 2020. "Analysis of the Use of Electric and Hybrid Drives on SWATH Ships" Energies 13, No. 24: 6486. https://doi.org/10.3390/en13246486.

Chalermkiat Nuchturee et al. Energy efficiency of integrated electric propulsion for ships—A review, Renewable and Sustainable Energy Reviews, vol. 134, 2020, 110145, ISSN 1364-0321, https://doi.org/10.1016/j.rser.2020.110145. (https://www.sciencedirect.com/science/article/pii/S1364032120304366).

* cited by examiner

HYBRID PROPULSION SYSTEM FOR BOATS AND SHIPS

FIELD OF THE INVENTION

Eco hybrid Power Unit for large boats and ships incorporating Eco power unit for small boats.

SUMMARY OF THE INVENTION

This invention uses Diesel/jet drive outboard and inboard motors with a generator attached to this and to the prop shaft which rotates and creates electricity to power the batteries. On large boats or ships with a gear change, the generator is mounted on the back of the gearbox, which is attached to the prop shaft and the generator rotates from the rotation of the prop shaft and the drive off the gearbox. With electrical water turbines used as thrusters and mechanical pressurized water turbines used for charging the batteries. The hybrid power unit also has electric motors attached to propellers, powered by electric batteries; the electric batteries are charged by the generator attached to the prop shaft and the water turbine charging units. This makes the large boat or ship a Hybrid power unit and is a switchable device in propelling a large boat or ship.

The outboard diesel/jet drive motors are positioned to the bow of the ship and the inboard motors are positioned midway in the hull. The number of diesel/jet drive motors are dependent on the size and weight ratio of the ship. The number of electric motors attached to propellers are also dependent on the size and weight ratio of the ship. The diesel/jet drive motors have an electrical/mechanical drive from the motors to the prop shaft which is attached to propellers, to propel the large boat or ship, or the generator is attached to the back of the gearbox and rotates from the drive of the gearbox, which is attached to the prop shaft and rotates off it, meaning the electrical/mechanical generator attached on the prop shaft, rotates from the rotation of the prop shaft and or gearbox and produces electricity to the batteries housed in the hull of the ship.

DETAIL DESCRIPTION OF THE DRAWINGS

Figure 1:
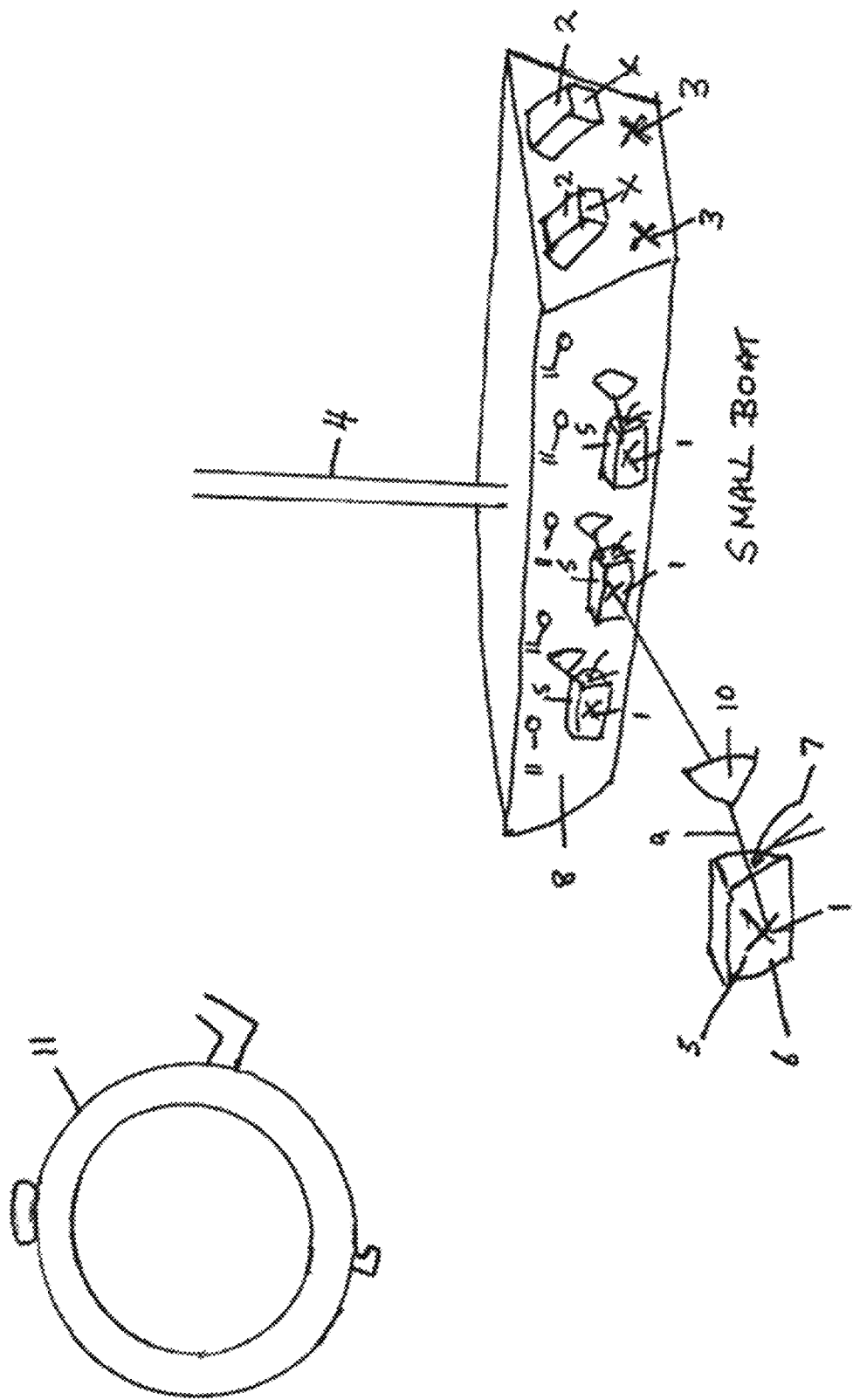
FIG. 1 shows a side elevation of a hybrid propulsion engine.
Figure 2:
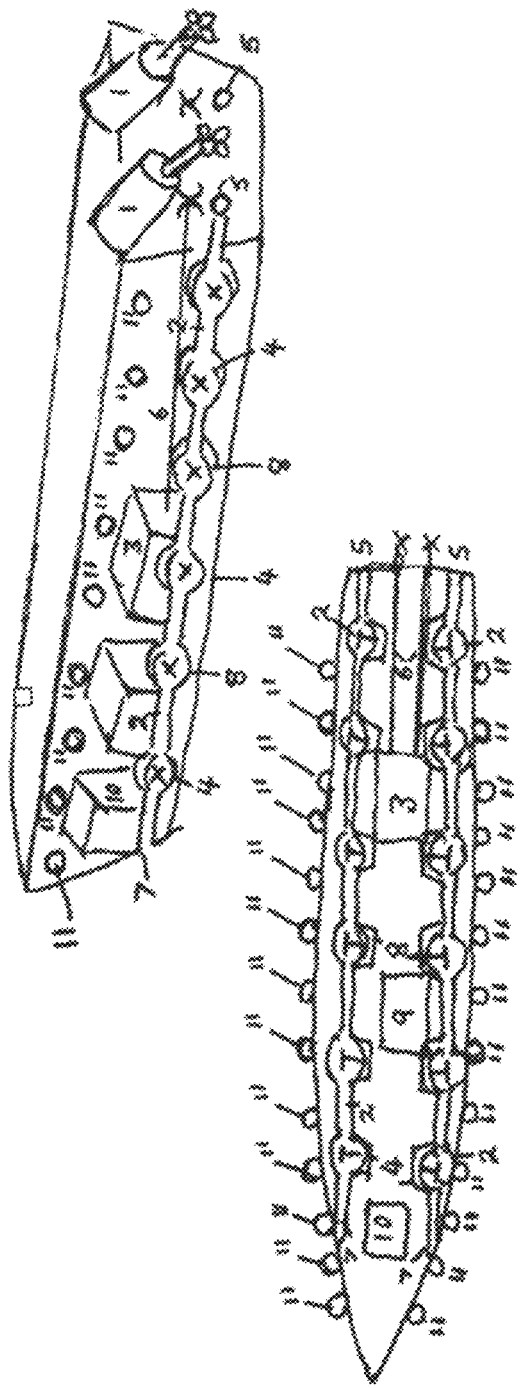
FIG. 2 shows an internal configuration of the hybrid propulsion engine.

The power unit for large boats and ships consist of the following.

(Power unit 1, the diesel/jet drive motors.) (Power unit 2,) the electrical and mechanical turbines housed in the intake of water pipe, are used as thrusters.) (Power unit 3,) electric motors attached to propellers powered by the electric batteries. Any of the Power units above can be used at any time as a switchable device to propel the large boat or ship. The electrical charging system is in operation the whole time, charging the electric batteries. The Hybrid large boat or ship saves on Diesel and cuts down on producing Carbon Emissions.

The electrical and mechanical turbines housed in whats known as "intake of water pipe and chambers," consisting of, to the front of the large boat or ship are two open pipes which take in water, which run inside the large boat or ship and open up as a chamber; inside the chambers are electrical water turbine blades/wheels attached to 24 volt, 5 horse power electric motors, the electrical turbine blades/wheels working as thrusters, which rotate and create water suction into the intake of water pipe; as the ship moves forward, bringing water into the intake of water pipe and chambers; the intake of water pipe is narrow in diameter to create water pressure and opens up in size as a chamber to allow the water flow to expand under pressure to rotate another electrically operated water turbine with blades/wheels, which rotate and create more water pressure inside the intake of water pipe and chambers; from the opening/chamber which houses the electric turbine blades/wheels the narrow intake of water pipe continues inside the hull of the large boat or ship, which allows water to flow under pressure.

The narrow intake of water pipe then opens up again in size as a chamber to allow the water flow to expand under pressure, due to the pressurized system. Inside this chamber are housed turbine blades attached to a mechanical water turbine; the shaft on the turbine has a weighted geared bearing which will assist the rotation of the turbine blades; as the water turbine rotates to produce rotational mechanical energy, the water turbine incorporates a power converter/generator which converts the rotational mechanical energy produced into electricity and charges the batteries. The ship must be traveling at 15 knots or the tidal waves moving at the equivalent of 15 knots for the water intake under pressure to work the mechanical water turbines which produces 96% electrical charge into the batteries. All the electric turbines use 24 volt, 5 horse power motors attached to turbine blades/wheels, rotating to create extra water pressure inside the intake of water pipe and chambers and the mechanical water turbine mechanism with water turbine blades, which rotates due to the water pressure and create rotational mechanical energy, having a power converter to convert the rotational mechanical energy into electricity to power the batteries. The pattern of multiple designs of the turbine arrangements required in the intake of water pipe, are dependent on the number of electric turbines, required for the water pressure and the number of water turbine charging units required in different sequences to charge the electric batteries. As long as positioned at the back of the intake of water pipe, are mechanical electric turbines pushing water out of water jets, working as thrusters.

The intake of water pipe and chambers run from the front to the rear of the large boat or ship, with the chambers housing either the mechanical turbine blades for charging the battery, or the electrical turbine blades/wheels, creating extra water pressure or keeping up the water pressure inside the intake of water pipe and chambers. The length of the water intake pipe is dependent upon the size of the large boat or ship, and the number of electrical turbines are dependent upon the pressure needed in the intake of water pipe to rotate the mechanical water turbines, charging the batteries.

At the back of the intake of water pipe on the large boat or ship are electrically driven blades/wheels attached to electric motors, which create a great deal of water pressure which pushes pressurized water out of the intake of water pipe through water jets at the back of the large boat or ship, creating a thruster and assisting to move the large boat or ship.

The number of mechanical turbines are dependent on the charging required for the number of electric batteries and the number of electric turbines used are dependent on the length of the intake of water pipe and chamber, because the electric turbines are used to create extra water pressure or keeping up the water pressure inside the intake of water pipe and chamber, allowing the mechanical water turbine blades to rotate and the turbine mechanism charging the electric batteries.

The electric batteries used on the large boat or ship are charged by both the diesel/jet drive motor's drive to rotate the prop shaft which rotates the electrical/mechanical generator which is wired to the batteries to charge them and the water turbine with blades housed in, what is known as "the intake of water pipe and chamber;" the mechanical water turbines are wired to the batteries to charge them and the electrical turbines take power from the batteries.

The weighted bearing on the water turbine blades helps to rotate the water turbine blades, due to the distribution of the weight as the water turbine blades rotate from the water pressure in the intake of water pipe and chamber. The intake of the water pipe and chamber run from the front of the large boat or ship to the rear of the large boat or ship on both sides; the intake of water pipe and chamber is clamped in place to both sides of the hull of the large boat or ship as a permanent fixture. The turbines or electric motors are mounted in the hull of the large boat or ship as a permanent fixture, running along the side of the intake of water pipe; the intake of water pipe is water tight to stop leaks, parts of the intake of water pipe has trap doors which are sealed to become water tight, but are opened by hinged arms with locking mechanism, allowing for maintenance. The electric batteries are fixed in the hull of the large boat or ship in a water tight casing, to stop water penetration and electric fires or shocks, away from the diesel tank. The diesel fuel tank is fixed in the hull of the large boat or ship with the fuel lines running to the diesel motors.

The large boat or ship is propelled by both the diesel/jet drive motor's drive to the prop shaft which drives the propellers, the electric motors attached to propellers and the thruster mechanism created from the intake of water into the water pipe and chamber; all power systems can be in operation or each can be used as a Hybrid power unit, switchable between operating systems.

Information and specification for Eco hybrid power and an electrical charging system for small boats. We use a number of water jet turbines with rotating blades creating electricity, also working as mechanical thruster units and electric motors attached to propellers. The small boat also has Diesel out board motors or sails. The small boat must be traveling at 15 knots or the tidal waves moving at the equivalent of 15 knots for the water turbines to work and produce 96% charge into the batteries, that are housed in the hull of the small boat. The average size of the small boat is 40 feet long. The water jet turbine blades are positioned on the outside of the hull of the small boat in a water tight casing, with an opening to the front of the water tight casing for the water to flow into, entering the water tight casing and rotating the water turbine blades. As the water turbine blades rotate, this produces water pressure inside the water tight casing. As the water pressure builds up the water pressure needs to escape. At the back of the water tight casing is a mechanical water jet, which allows the water to escape under pressure. The water escapes through the water jet under pressure and goes into the water outside the water tight casing, working as a mechanical thruster. The water turbine blades have a weighted bearing which is attached by a shaft, running from the turbine blades in the water tight casing to the mechanical turbine mechanism held in the hull of the small boat.

The turbine blades have a weighted bearing which helps to rotate the water turbine blades due to distribution of the weight as the water turbine blades rotate in the water tight casing. When the small boat reaches 15 knots by the Eco hybrid power unit or the tidal waves moving at the equivalent of 15 knots, the water turbine blades will rotate and rotate the water turbine mechanism; the water turbine produces rotational mechanical energy; the water turbine mechanism has a power converter incorporated to convert the rotational mechanical energy produced into 96% electricity to power the batteries. The batteries are held in the hull of the small boat which are connected to the electric motors which rotate the propellers, assist in propelling the small boat. The small boat also has diesel outboard motors or sails with mechanical thruster units, making the small boat a hybrid powered boat. The Hybrid propulsion system is switchable. The electric batteries are held in a water tight container fixed in the hull of the small boat, away from the diesel tank for safety. The diesel tank is fixed in position in the hull, connected to the diesel motors.

The electric motors are inboard attached to a prop shaft with propellers in the water, the electric motors being powered by the batteries and the diesel jet drive motors are outboard. The electric motors and batteries are in a sealed unit held in the hull of the small boat—with an alarm trip-switch to stop charging in the event of water penetration. With the new Marine Technology invention to cut down on Thermodynamics-friction all the materials used in manufacturing the rotating components are made of titanium metal machined to high quality, which does not expand with heat and polymer type material which holds heat.

The port hole windows instead of glass will have solar panels housed into the casing of the port hole windows, the solar panels are connected to the electric batteries to create electricity to charge the electric batteries.

The casing of the port hole windows will be a latch with lever arms to adjust the position of the port hole windows towards the sun.

On and around the vessel will have positioned solar panels attached to the electric batteries to create electricity to charge the electric batteries.

At the end of the pipe used to create water pressure will be narrowed to create extra pressure which will give the vessel extra thrust.

The invention claimed is:
1. A hybrid engine for vessels comprising:
a water vessel with a hybrid propulsion and an electrical energy generating unit,
a diesel engine with a propeller shaft and a propeller for propelling the vessel,
wherein the electrical energy generating unit includes an electrical generator for generating electricity from the rotation of the propeller shaft and is coupled to batteries for storing the generated electricity,
a plurality of electrical water turbines with turbine blades are housed in the intake of a water pipe, within the vessel's hull, and chambers are arranged within the vessel's hull, the water pipes and chambers are being interconnected,
wherein the turbine blades operate in a drive mode where they are driven by electrical energy to propel the vessel and a generation mode where the flow of water into the water pipes and chambers rotates the turbine blades to generate electricity,
wherein the pipe narrows at the end to generate extra water pressure, providing the vessel with extra thrust,
a plurality of external water turbines, the blades of which are mounted in a housing positioned on the outside of the vessel's hull, and each of the housing having a water inlet and a water outlet, wherein the external water turbines are operated in a drive mode where the turbine blades are driven by electrical energy to act as thrusters in combination with the turbine housings to force water from the outlets and a generation mode where the turbine blades are rotated by the flow of water through the housings to generate electricity, and a plurality of port hole windows having solar panels housed into the casing of the port hole windows, wherein the solar panels are connected to the electric batteries to store the generated electricity, and wherein the casing of the port hole windows includes a latch with lever arms to adjust the position of the port hole windows towards the sun to create electricity to charge the electric batteries.

2. The hybrid vessel propulsion and generating system according to claim 1, wherein a gearbox is attached to the propeller shaft and the electrical generator is mounted on the gearbox, the electrical generator being rotated by the rotation of the propeller shaft and a drive of the gearbox.

3. The hybrid vessel propulsion and generating system according to claim 1, wherein on large vessels diesel jet drive outboard and inboard motors are provided.

4. The hybrid vessel propulsion and generating system according to claim 1, wherein the turbine blades in the water pipe intake and chambers are powered in the drive mode by 24 volts 5 horsepower electric motors.

5. The hybrid vessel propulsion and generating system according to claim 1, wherein the propulsion system further comprises electric motors, powered by the batteries, attached to propellers.

6. The hybrid vessel propulsion and generating system according to claim 1, wherein the water turbine blades, when in the generation mode, are connected to a power converter to produce electricity from rotational energy.

7. The hybrid vessel propulsion and generating system according to claim 3, wherein the diesel jet drive outboard motors are positioned at the bow of the vessel and the inboard motors are positioned midway along the hull.

8. The hybrid vessel propulsion and generating system according to claim 1, wherein the turbines in the water pipe intake are electrical and mechanical.

9. The hybrid vessel propulsion and generating system according to claim 1, wherein two water pipes are provided within the vessel's hull.

10. The hybrid vessel propulsion and generating system according to claim 1, wherein the chambers within the vessel's hull house mechanical turbine blades that generate electricity in the generation mode and create extra water pressure in the drive mode.

11. The hybrid vessel propulsion and generating system according to claim 1, wherein in the drive mode the turbine blades in the intake of the water pipe are positioned at the back of the intake and create pressure that forces water through the water pipe and creates a thrust at a water pipe outlet at the stem of the vessel.

12. The hybrid vessel propulsion and generating system according to claim 1, wherein the operation of the generation mode is dependent on the charging required for each of the batteries.

13. The hybrid vessel propulsion and generating system according to claim 3, wherein the batteries are also charged by the generator attached to the propeller shafts of the diesel jet drive outboard and inboard motors.

14. The hybrid vessel propulsion and generating system according to claim 1, wherein the turbine blades have a weighted bearing that helps the turbine blades to rotate through enhanced weight distribution.

15. The hybrid vessel propulsion and generating system according to claim 9, wherein the two water pipes run from bow to stem of the vessel on either side of the vessel, fixed in place by clamps as a permanent fixture.

16. The hybrid vessel propulsion and generating system according to claim 4, wherein the electric motors are mounted in the hull along the side of the water pipe intake.

17. The hybrid vessel propulsion and generating system according to claim 1, wherein at the end of the water pipe intake to create water pressure will be narrowed to create extra pressure which will give the vessel extra thrust.

18. The hybrid vessel propulsion and generating system according to claim 1, wherein the electric batteries are fixed in the hull of the vessel in a water tight casing to stop water penetration and electric fires or shocks and are positioned away from a diesel tank.

19. The hybrid vessel propulsion and generating system according to claim 1, wherein a diesel fuel tank is fixed in the hull with the fuel lines running to the diesel engine and diesel motors.

20. The hybrid vessel propulsion and generating system according to claim 1, wherein the turbine blades have a weighted bearing attached by a shaft, within a water tight casing, that runs from the turbine blades to a mechanical turbine mechanism within the hull of the vessel.

21. The hybrid vessel propulsion and generating system according to claim 1, wherein the batteries are held in the hull of the vessel and are connected to electric motors which rotate propellers, the batteries being charged by the water turbines when in generation mode.

22. The hybrid vessel propulsion and generating system according to claim 4, wherein the electric batteries are held in a water tight container fixed in the hull of the vessel, connected to the water turbines and the electric motors and positioned away from a diesel tank that is provided in a fixed in position within the hull and is connected to the diesel engine.

23. The hybrid vessel propulsion and generating system according to claim 1, wherein electric motors are provided inboard and are attached to a propeller shaft with propellers, the electric motors being powered by the batteries.

24. The hybrid vessel propulsion and generating system according to claim 21, wherein the electric motors and batteries are provided in a sealed unit within the hull of the vessel with an alarm trip/stop switch to stop charging in the event of water penetration.

25. The hybrid vessel propulsion and generating system according to claim 3, wherein all rotating components of the system are formed from Titanium, machined to a high-quality standard and a polymer material.

\* \* \* \* \*